(12) United States Patent
Gustafsson et al.

(10) Patent No.: US 9,363,684 B2
(45) Date of Patent: Jun. 7, 2016

(54) DETERMINING LOSS OF IP PACKETS

(75) Inventors: Jorgen Gustafsson, Lulea (SE); Gunnar Heikkila, Gammelstad (SE); Tomas Lundberg, Lulea (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 159 days.

(21) Appl. No.: 13/876,820

(22) PCT Filed: Sep. 14, 2011

(86) PCT No.: PCT/SE2011/051107
§ 371 (c)(1),
(2), (4) Date: Mar. 28, 2013

(87) PCT Pub. No.: WO2012/044234
PCT Pub. Date: Apr. 5, 2012

(65) Prior Publication Data
US 2013/0194958 A1  Aug. 1, 2013

Related U.S. Application Data

(60) Provisional application No. 61/387,503, filed on Sep. 29, 2010.

(51) Int. Cl.
*H04L 12/16* (2006.01)
*H04W 24/00* (2009.01)
(Continued)

(52) U.S. Cl.
CPC ............ *H04W 24/00* (2013.01); *H04L 65/604* (2013.01); *H04L 69/40* (2013.01); *H04N 21/42607* (2013.01); *H04N 21/44209* (2013.01); *H04N 21/643* (2013.01); *H04N 21/6473* (2013.01); *H04N 21/64322* (2013.01); *H04L 69/22* (2013.01)

(58) Field of Classification Search
CPC .......................... H04N 21/44209; H04L 65/80
USPC .......................................................... 370/230
See application file for complete search history.

(56) References Cited

U.S. PATENT DOCUMENTS 7,475,003 B1    1/2009  Madhusudhana et al.
8,315,312 B2 *  11/2012 Nagafuji ................. 375/240.25
(Continued)

FOREIGN PATENT DOCUMENTS

CN    101500341 A    8/2009
WO    2010092848 A1  8/2010

OTHER PUBLICATIONS

Extended European Search Report dated Apr. 7, 2014, issued in European Patent Application No. 11829680.5, 7 pages.
(Continued)

*Primary Examiner* — Mark Rinehart
*Assistant Examiner* — Matthew Hopkins
(74) *Attorney, Agent, or Firm* — Rothwell, Figg, Ernst & Manbeck, P.C.

(57) ABSTRACT

A method of determining loss of IP packets that are transported over a network (102), where each IP packet comprises a number of data packets. The method comprises: i) extracting (501) a first data packet from a first IP packet (41), ii) extracting (502) a second data packet from a second IP packet, iii) retrieving (503, 504) a first sequence number from a first data packet and a second sequence number from a second data packet, where each of the sequence numbers is indicative of a sequence of data packets and has a value belonging to a set of a number of unique values, iv) calculating (505) a difference ($\Delta_{cc}$) between the sequence numbers, and v) determining (506) a number (k) of lost IP packets, as a function of the difference ($\Delta_{cc}$) between the sequence numbers. Related computer readable medium and customer equipment are also described.

14 Claims, 3 Drawing Sheets

(51) Int. Cl.
  *H04N 21/442* (2011.01)
  *H04N 21/426* (2011.01)
  *H04N 21/643* (2011.01)
  *H04N 21/647* (2011.01)
  *H04L 29/06* (2006.01)
  *H04L 29/14* (2006.01)

(56) References Cited

U.S. PATENT DOCUMENTS

2004/0156366 A1 8/2004 Walls et al.
2005/0232151 A1* 10/2005 Chapweske ........... H04L 1/0002
                                                          370/231
2006/0239204 A1 10/2006 Bordonaro et al.
2007/0127466 A1 6/2007 Seon
2008/0267216 A1* 10/2008 Vergnaud ..................... 370/474
2008/0295163 A1 11/2008 Kang et al.
2010/0135180 A1 6/2010 Morinaga et al.
2010/0153827 A1 6/2010 Koster et al.
2011/0289540 A1 11/2011 Yachida

OTHER PUBLICATIONS

Office Action dated Mar. 17, 2015, issued in Chinese Patent Application No. 201180047239.9, 10 pages.

* cited by examiner

DETERMINING LOSS OF IP PACKETS

CROSS REFERENCE TO RELATED APPLICATION(S)

This application is a 35 U.S.C. §371 National Phase Entry Application from PCT/SE2011/051107, filed Sep. 14, 2011, designating the United States, and also claims the benefit of U.S. Provisional Application No. 61/387,503, filed Sep. 29, 2010. The disclosures of both applications are incorporated herein in their entirety by reference.

TECHNICAL FIELD

The invention relates to determining loss of IP packets that are transported over a network.

BACKGROUND ART

Today Internet Protocol television (IPTV) is a digital television system delivered over the Internet. IPTV encompasses both "ordinary" live TV and stored video, which often is referred to as Video on Demand. IPTV provides video and associated audio and sub-titles that is coded by a video encoder and audio encoder, respectively, and is then sent by using a transport stream (TS) that reaches the users. A commonly used transport stream for video and associated audio is the MPEG2-TS, which is a transport stream specified in MPEG-2 Part 1, Systems (formally known as ISO/IEC standard 13818-1 or ITU-T Rec. H.222.0).

In further detail, the MPEG2-TS specifies a container format that encapsulates packetized elementary streams, with error correction and stream synchronization features for maintaining transmission integrity if a signal used by the transport stream is degraded. MPEG2-TS is now a standard for the generic coding of moving pictures and associated audio information, and describes a combination of video compression and related audio data compression methods which permit storage and transmission of movies by using currently available storage media and transmission bandwidth.

Other types of transport streams are also used, and the type of information transported by the various transport streams typically vary and can in addition to IPTV be related to service like Voice over IP, Trivial File Transfer Protocol and many online games. However, the mentioned transport streams are all common in the sense that they transport data packets.

When transmitting data packets over an IP-network, the data packets must be encapsulated by using other protocols, for example by either using Real-time Transport Protocol (RTP) and User Datagram Protocol (UDP), or directly by using UDP. In turn, these packets are encapsulated using the Internet Protocol (IP), which is a basic protocol in the Internet Protocol Suite. The job of IP is to deliver the IP packets from the source host to the destination host. Using IP only provides a best effort delivery and is thus often an unreliable service. The lack of reliability can cause errors on the receiving side such as data corruption, lost data packets, duplicate arrival, or out-of-order packet delivery. To wholly or partly take measurements against such errors, higher level protocols as specified by e.g. UDP or the Transmission Control Protocol (TCP) can be used.

Some transport protocols used on the Internet, for instance TCP, contains sequence numbers which are incremented for each TCP/IP packet. This facilitates detection of packet losses, and in TCP this is used to ask for a retransmission of the missing packets. For real-time services, such as IPTV, it is not possible to use retransmission since it takes too much time. For realtime services, UDP is therefore often used. Similarly to IP, UDP does not contain any sequence number either, which makes it hard to detect transmission errors by using UDP/IP only. RTP on the other hand contains a sequence number which is large enough to reliable provide detection of packet losses, which means that real-time services employing RTP/UDP/IP can detect packet losses.

As mentioned, when the IP packets are transported over a network, impairments such as delay, jitter, and loss of IP packets can occur. This may affect the quality of the data, or service, contained by the data packets and provided to a user. An effect of the impairments is that data packets are missing at a Consumer Premises Equipment (CPE) that decodes the data packets and provides the service to a user (after the jitter buffer but before the decoder). This affects the quality of experience, and it is important that the service provider can obtain information about this, such that measures can be taken to improve the situation.

Hence, from a service monitoring point of view it is important to keep track of the loss of IP packets and/or the loss of data packets that are encapsulated by the IP packets.

Prior art address this issue, such as patent document US2010135180 A1 which discloses method of measuring packet loss, or more specifically packet loss rate. The method includes intermittently capturing packets during a session. A capture success number indicating a number captured packets and a capturable number indicating a possible number of the packets to be captured are counted. A loss rate indicating a rate of losing the packets is calculated, according to the capture success number and the capturable number.

A number of further techniques exist, of which some are more general in terms of determining packet loss while others are able to determine packet loss for quite specific types of IP packets and/or data packets.

Known techniques are generally capable of determining packet loss. However, it is believed that prior art may be improved in the sense that more accurate packet loss calculation may be employed, both in respect of loss of general types of data packets and loss of more specific types of data packets.

SUMMARY

It is an object of the invention to at least partly overcome one or more limitations of the prior art. In particular, it is an object to provide a useful and accurate method of determining loss of IP packets that are transported over a network.

Hence a method is provided for determining loss of IP packets that are transported over a network, where each IP packet comprises a number n of data packets. The method comprises extracting a first data packet from a first IP packet and extracting a second data packet from a second IP packet. A first sequence number is retrieved from the first data packet and a second sequence number is retrieved from the second data packet, where each of the sequence numbers is indicative of a sequence of data packets and has a value belonging to a set of a number x of unique values. A difference $\Delta_{cc}$ between the sequence numbers is calculated, and a number k of lost IP packets is determined as a function of the difference $\Delta_{cc}$ between the sequence numbers.

The method is advantageous in that a relatively greater number of lost IP packets can be determined, which is important since loss of IP packets is one of the major degradation causes for e.g. IPTV. When the number of lost IP packets is known, it is easier to assess a service performance and a maintenance or upgrade action that might alleviate the situation.

More particularly, the data packets may be MPEG2-packets, and/or each IP packet may comprise an UDP packet with an UDP header.

The number n of data packets may be calculated from a total length (L-udp) of the UDP packet, a length (L-udh) of an UDP header and a length (L-data) of a data packet transported in the UDP packet. In detail, n may be determined as (L-udp−L-udh)/L-data, where n is the number of data packets, L-udp is the length of the UDP packet, L-udh is a length of a UDP header, and L-data is a length of a data packet transported in the UDP packet. Also, n may be determined to have a value of 7.

The method may comprise determining the number k of lost IP packets as a function of the set of x number of unique values. Specifically, the number k of lost IP packets may be determined as a function of $$\Delta_{cc} = (k \cdot n + 1)(\mod x).$$

The set of x number of unique values may be equal to or less than 256. More specifically, x may be equal to or less than 16.

The first data packet may be the first packet in the first IP packet, and/or the second data packet may be the last packet in the second IP packet.

The method may further comprise determining a number k·n of lost data packets, by multiplying the number k of lost IP packets with the number n of data packets comprised in an IP packet.

The method may also comprise, if an IP packet is lost, retrieving from the second data packet a payload start flag, and, if the flag is not indicative of start of data, iteratively incrementing the number k of lost IP packets until i) a next calculated difference $\Delta_{cc}$ between the first sequence number and a sequence number of a next data packet indicates that no further data packet is lost, and ii) a payload start flag of the next data packet is indicative of start of user data.

In one embodiment the IP packets that are transported over the network comprise a first and a second type of data packets, and the difference $\Delta_{cc}$ between the sequence numbers is then calculated for the first type of IP packets. The method then comprises the additional steps of: calculating a corresponding difference $\Delta_{cc}2$ between sequence numbers of the second type of data packets, and determining a number k of lost IP packets, as a function of a loss value indicated by both calculated differences $\Delta_{cc}$, $\Delta_{cc}2$.

In this embodiment there might be more than one data stream multiplexed in the IP packets, for instance $n_1$ data packets of type-1 (such as video), and $n_2$ data packets of type-2 (such as audio). These data streams may typically have separate continuity counters. The method can then be used on the streams independently, which gives a range of possible losses of IP packet losses for each stream. These losses may then be combined in the sense that a lowest possible IP packet loss which is common for both streams is selected. For example, if the numbers of possible IP packet losses are calculated as 3, 6, 9, 12 for type-1 data packets, and 4, 8, 12, 16 for type-2 data packets, then the actual packet loss is 12. This embodiment for handling different types of data packets may be generalized to more than two streams and also to the case when the number of data packets in each IP packet is not constant.

According to another aspect computer readable medium is provided for determining loss of IP packets that are transported over a network, where each IP packet comprises n number of data packets. The computer readable medium has stored thereon processing instructions which when run on a customer equipment causes the customer equipment to perform the steps of the method described above.

According to a further aspect a customer equipment is provided, which is configured to determine loss of IP packets that are transported over a network, where each IP packet comprises a number n of data packets. The customer equipment comprising a processing unit configured to i) extract a first data packet from a first IP packet, ii) extract a second data packet from a second IP packet, iii) retrieve a first sequence number from the first data packet and a second sequence number from the second data packet, where each of the sequence numbers is indicative of a sequence of data packets and has a value belonging to a set of a number x of unique values, iv) calculate a difference $\Delta_{cc}$ between the sequence numbers, and v) determine a number k of lost IP packets, as a function of the difference $\Delta_{cc}$ between the sequence numbers.

The computer readable medium may have stored processing instructions that include any of the features described above in association with the method of determining loss of IP packets, and share the corresponding advantages. The same applies for the customer equipment and/or the configuration of the processing unit. Still other objectives, features, aspects and advantages of the invention will appear from the following detailed description, from the attached claims as well as from the drawings.

BRIEF DESCRIPTION OF THE DRAWINGS

Embodiments of the invention will now be described, by way of example, with reference to the accompanying schematic drawings, in which.

DETAILED DESCRIPTION OF PREFERRED EMBODIMENTS

Figure 1:
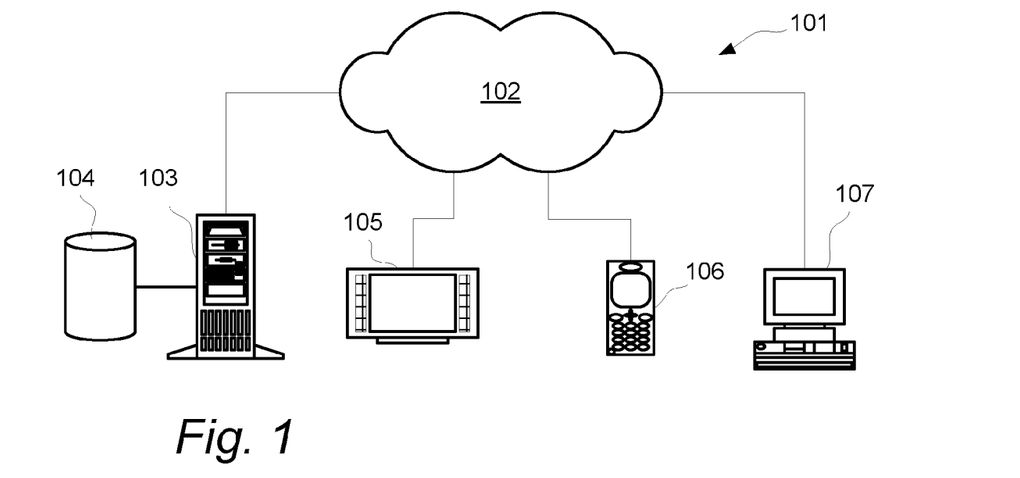
FIG. 1 is a perspective view of a communication network over which IP packets are transported to a number of customer equipments.

With reference to FIG. 1 an example of a communication network 101 is illustrated. The communication network 101 comprises a network 102 such as the Internet, to which a content server 103 is connected. The content server 103 is connected to a database 104 on which content such as video, audio and other types of data is stored. The content server 103 is, via the network 102, connected to a number of content recipients in form of customer equipments, such as a TV 105, a mobile phone 106, a personal computer 107, or any other electronic device capable of receiving streamed content over the network 102. The content server 103 is configured to send data via the network 102 to the customer equipments 105, 106, 107, which in turn are configured to receive the data, such that the data can be used by the customer equipments 105, 106, 107.

Sending, receiving and any data encoding/decoding are performed in a conventional manner, and all involved devices implement suitable, known network protocols that support e.g. sending and/or receiving the data.

More particularly, each of the content server 103 and the customer equipments 105, 106, 107 implements the Internet Protocol Suite used for the Internet and other similar networks, which includes the well known Transmission Control Protocol (TCP), the Internet Protocol (IP), the Real-time Transport Protocol (RTP) and the User Datagram Protocol (UDP). With UDP, various applications residing on the content server 103 and the customer equipments 105, 106, 107 can exchange data and service, which includes streaming media applications such as IPTV, Voice over IP (VoIP) and Trivial File Transfer Protocol.

For supporting e.g. IPTV, each of the content server 103 and the customer equipments 105, 106, 107 implements the MPEG2 transport protocol (MPEG2-TS), which is a standard for coding video and associated audio information. Thus, the content server 103 can retrieve from its content database coded video and audio data that is, by employing e.g. UDP, streamed to the customer equipments 105, 106, 107 which decodes the data and provides it to a user. This means that the content server 103 can, by employing UDP, transport IP packets over the network 102 and to the customer equipments 105, 106, 107. Each IP packet may then comprise a number of MPEG2-TS packets, and the customer equipments 105, 106, 107 may extract MPEG2-TS packets from the IP packets. As is known, an MPEG2-TS packet is a type of data packet, and other types of data packets may be sent to the customer equipments 105, 106, 107 by employing UDP that encapsulates the data packets. The other types of data packets which may be sent generally include data packets used by real time applications that are relatively insensitive to packet loss.

In this context and as is known, the IP packets are sent to the customer equipments 105, 106, 107 in form of a stream of IP packets.

Figure 2:
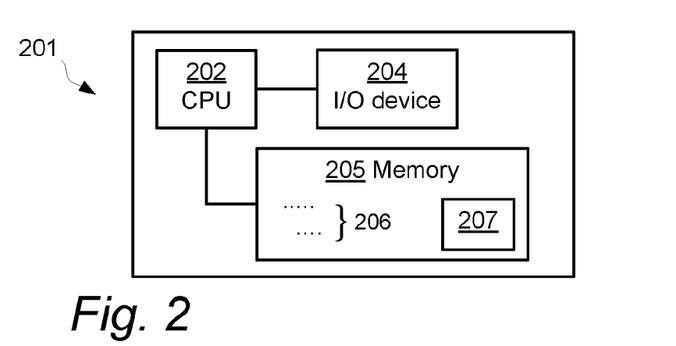
FIG. 2 illustrates an embodiment of a customer equipment to which IP packets are transported.

In further detail, FIG. 2 illustrates a customer equipment 201 that is connected to the content server 103 via the network 102. The customer equipment 201 comprises a processing unit 202 which is connected to a computer readable medium 205, in the form of e.g. a non-volatile memory such as a hard disk, ROM (Read-Only Memory) and a flash memory. The computer readable medium 205 has stored thereon a computer program 206, which comprises software instructions that, when run on the customer equipment 201, causes the customer equipment 201 to perform the method steps described below. More particularly, the processing unit 202 can execute the software instructions and is then, when performing the execution, configured to perform the method steps described below. Additionally, a communications interface 204 is connected to the processor unit 202 for providing communication with the content server 103 via the network 102.

The software instructions 206, i.e. a computer program code for carrying out the operations of the customer equipment 201 described herein may for development convenience be written in a high-level programming language such as Java, C, and/or C++ but also in other programming languages, such as, but not limited to, interpreted languages. Some modules or routines for the operation of the customer equipment 201 may be written in assembly language or even micro-code to enhance performance and/or memory usage. It will be further appreciated that functional steps performed by the customer equipment 201 may be implemented by using one or more processor, such as e.g. the processing unit 202, discrete hardware components, one or more application specific integrated circuits, signal processor or microcontroller.

The customer equipment 201 is a schematic example of the customer equipments 105, 106, 107 of FIG. 1 and implements the same functionality, i.e. the customer equipment 201 implements the protocols TCP, IP, UDP and MPEG2-TS, and supports e.g. IPTV. This means that the customer equipment 201 also comprises means and software instructions for receiving and decoding a video stream and subsequently play the video content of the video stream. For being able to play the video content the customer equipment 201 comprises an MPEG2 decoder 207, which is implemented according to known techniques and standards.

Figure 3:
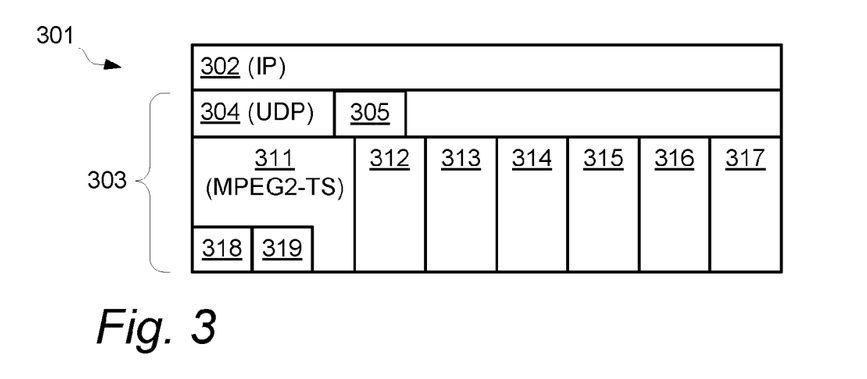
FIG. 3 illustrates an IP packet transported to the customer equipment of FIG. 2.

With reference to FIG. 3 an example of an IP packet 301 that employs UDP is illustrated. The IP packet 301 is an example of a packet that transports data from the content server 103 to one of the customer equipments 105, 106, 107, 201. By virtue of the employed protocols, the IP packet 301 comprises an IP-header 302 that has a length, i.e. data size, of L-iph bytes (typically 20 bytes). The IP packet 301 also comprises an UDP packet 303 with an UDP-header 304 that has a length of L-udh bytes (typically 8 bytes), and comprises n number of data packets, which in this example are 7 MPEG2-TS packets 311-317.

As is known, the UDP header 304 has e.g. a length field 305 that indicates the length of the UDP packet 303, which includes the header 304 and a payload of data packets 311-317. The value of the length field 305 is herein referred to as L-udp. Also, as exemplified by MPEG2-TS packet 311, each MPEG2-TS packet comprises a field 318 for a payload start flag, which also is referred to as the "Payload Unit Start Indicator" (PUSI), and a field 319 for a sequence number, which is often referred to as a continuity counter. Each of the MPEG2-TS packets has a length L-data of 188 bytes. A total maximum length of the IP packet 301 can be estimated to L-mto bytes, which is the typical so called maximum transmission unit (MTU) of approximately 1500 bytes that can be employed for the IP packet 301.

The content server 103 employs, for example, UDP and MPEG2-TS for providing content to the customer equipment 201. Then packet loss can occur, which affects a quality experience perceived by a user of the customer equipment 201. The packet loss is determined and preferably also reported by virtue of steps performed by the customer equipment 201 as described below.

The principles behind these steps employ results from some investigations. More particularly, usually calculation of packet loss is handled by investigating sequence numbers of transported IP packets. For instance, if RTP is used for transporting IP packets, instead of e.g. UDP, then the RTP header holds is a sequence number that is incremented for each IP packet sent. This sequence number can be used by a customer equipment for detecting packet loss and, in case the packets were delivered out of sequence, can be used to restore packet sequence. When RTP is employed the sequence number is stored with 16 bits.

However, when e.g. MPEG2-TS are encapsulated in an IP packet by using UDP there is a problem, since neither IP nor UDP has something similar to sequence numbers. Although MPEG2-TS has a kind of sequence numbers (the continuity counter), it is only 4 bits long and consequently wraps around after 16 packets.

Herein, the term continuity counter is the same as a sequence number and it has a value that belongs to a set of x number of unique values. x is limited, and is typically equal to or less than 256. An even more specific value of x is 16.

The continuity counter of MPEG2-TS increments with 1 for each (new) MPEG2-TS packet and is used by the decoder 207 in the customer equipment 201 for detecting duplicate packets (it is allowed to send two, but no more, identical packets) or missing packets. The difference, modulo x (i.e. modulo 16 for e.g. MPEG2-TS), between the continuity counters for two consecutive MPEG2-TS packets should be equal to 1. If the difference between the continuity counters is 0, then the MPEG2-TS packets are duplicates and one is discarded. If the difference is neither 0 nor 1, then one or several MPEG2-TS packets have been lost.

The limited length of 4 bits of the continuity counter makes it difficult to use it as a counter for determining a number of lost IP packets. The problem is exemplified by noting that a loss of e.g. 18 packets give the same continuity counter difference as if only 2 packets are lost (since 18=2 mod 16).

The steps below use the fact that several MPEG2-TS packets, i.e. n number of MPEG2-TS packets, usually are combined into one IP packet.

The value for n is the number of MPEG2-TS packets in each IP packet, and is typically 7 since this give a total IP packet size of 1344 bytes, which is less than the typical maximum transmission unit (MTU) of approximately 1500 bytes for e.g. Ethernet-based networks.

The size L-iph of the IP header 302 is typically 20 bytes and the size L-udh of the UDP header 304 is typically 8 bytes, which are the minimum header sizes. If IP header options are used for the IP packet 301 then the IP header will be bigger, and hence the number of MPEG2-TS packets may need to be less than 7 in order for the total size of the IP packet to be less than the MTU, having in mind that the size L-data an MPEG2-TS packet is generally 188 bytes. However, n=7 for the vast majority of IP packets that encapsulate data packets in form of MPEG2-TS packets. In a more general case n can be calculated from the following expression:

$$n=(L\text{-}udp-L\text{-}udh)/L\text{-}data \quad (1)$$

From expression (1) follows that n is calculated from a length L-udp of the IP packet, a length L-udh of an UDP header, and a length L-data of the data packet transported in the IP packet.

All MPEG2-TS packet losses occur for whole IP packets. This means that if one or several IP packets are lost, all the MPEG2-TS packets contained therein are also lost. This gives a signature in the continuity counter difference which may be used for calculating a loss of IP packets. Also, up to 105 (15×n) consecutive MPEG2-TS packet losses can, in the typical case, be detected. This can be compared to a situation where the continuity counter is directly used for the packet loss calculation, in which case only 15 consecutive MPEG2-TS packet losses can be detected.

For determining loss of IP packets a number of calculations can be done. The calculations are exemplified in connection with FIG. 4 which illustrates a first IP packet 41 and a second IP packet 42 which each comprises seven MPEG2-TS packets 411-417 respectively 421-427. Each of the IP packets 41, 42 and their respective MPEG2-TS packets corresponds to the IP packet 301 with MPEG2-TS packets 311-317 of FIG. 3. This means that the MPEG2-TS packets include a respective continuity counter.

Figure 4:
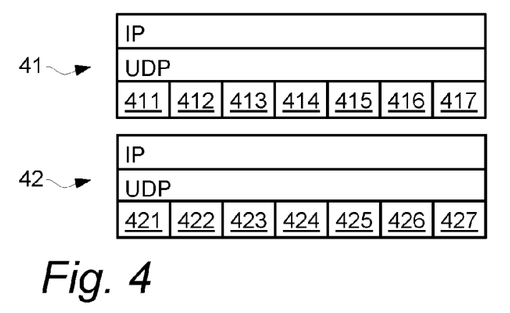
FIG. 4 illustrates two IP packets that support an example of how loss of IP packets may be determined.

For the calculations it is assumed that the first MPEG2-TS packet 411 in the first IP packet 41 (say IP packet number 1) has the following value for its continuity counter $CC_{first,1}$:

$$CC_{first,1}=m(\bmod x), \quad (2)$$

where x represents the total number of unique values a continuity counter may have and m represents the current value of the continuity counter. For the example herein x=16.

Assuming that n number of MPEG2-TS packets are encapsulated per IP packet and that the number of MPEG2-TS packets in each IP packet does not vary, i.e. that n is constant, then the last MPEG2-TS packet 417 in the first IP packet 41 will have the following value for its continuity counter $CC_{last,1}$:

$$CC_{last,1}=(m+n-1)(\bmod x) \quad (3)$$

It can be assumed that no duplicate TS packets are sent. For the next IP packet, i.e. for the second IP packet 42 (packet number 2), a continuity counter $CC_{first,2}$ of the first MPEG2-TS packet 421 and a continuity counter $CC_{last,2}$ of the last MPEG2-TS packet 427 will be:

$$CC_{first,2}=(m+n)(\bmod x) \quad (4)$$

$$CC_{last,2}=(m+2n-1)(\bmod x) \quad (5)$$

For packet number k+1 the corresponding continuity counters will be:

$$CC_{first,k+1}=(m+(k+1)n)(\bmod x) \quad (6)$$

$$CC_{last,k+1}=(m+(k+2)n-1)(\bmod x) \quad (7)$$

If k intermediate IP packets are lost, then an absolute difference $\Delta_{CC}$ in continuity counter between the first MPEG2-TS packet in a k+1:th IP packet and the last MPEG2-TS packet in the $1^{st}$ IP packet will, by combining expressions (3) and (6), be:

$$\Delta_{CC}=(m+(k+1)n-(m+n-1))(\bmod x)=(k\cdot n+1)(\bmod x) \quad (8)$$

The number of MPEG2-TS packets per IP packet, i.e. n, can be found by employing expression (1). When n is known, expression (8) can be used to determine a lower bound for the number k of lost IP packets by the difference in the continuity counter, $\Delta_{CC}$. Thus a number k of lost IP packets can be determined based on the set of x number of unique values.

Alternatively, a table look-up can be used, where values in the table are determined by using expression (8). When n=7 (the most common case), then the number of lost IP packets is k and the number of lost MPEG2-TS packets is k·n, as shown in the exemplifying table 1.

TABLE 1

| | n = 7, x = 16 | |
|---|---|---|
| $\Delta_{cc}$ | k (# of lost IP packets) | k·n (# of lost MPEG2-TS packets) |
| 0 | 0, 16, 32 ...† | 0, 112, 224 ...† |
|   | 9, 25, 41 ...‡ | 63, 175, 287 ...‡ |
| 1 | 0, 16, 32 ... | 0, 112, 224 ... |
| 2 | 7, 23, 39 ... | 49, 161, 273 ... |
| 3 | 14, 30, 46 ... | 98, 210, 322 ... |
| 4 | 5, 21, 37 ... | 35, 147, 259 ... |
| 5 | 12, 28, 44 ... | 84, 196, 308 ... |
| 6 | 3, 19, 35 ... | 21, 133, 245 ... |
| 7 | 10, 26, 42 ... | 70, 182, 294 ... |
| 8 | 1, 17, 33 ... | 7, 119, 231 ... |
| 9 | 8, 24, 40 ... | 56, 168, 280 ... |
| 10 | 15, 31, 47 ... | 105, 217, 329 ... |
| 11 | 6, 22, 38 ... | 42, 154, 266 ... |
| 12 | 13, 29, 45 ... | 91, 203, 315 ... |
| 13 | 4, 20, 36 ... | 28, 140, 252 ... |
| 14 | 11, 27, 43 ... | 77, 189, 301 ... |
| 15 | 2, 18, 34 ... | 14, 126, 238 ... |

†If duplicate data packets are used
‡If duplicate data packets are not used

The first value in the k column is the lowest possible number of lost IP packets, while the other values are other possible values of IP packet losses which produce the same $\Delta_{CC}$. It should be noted that due to the modulus operator (mod x) the expressions above work well when n and x are relative prime, i.e. when they have no common factors except 1, as in Table 1 where up to 105 lost MPEG2-TS packets can be unambiguously identified. The corresponding tables for n=1 and n=6 are shown below in table 2 respectively in table 3, and it can be seen that only up to 15 respectively 42 lost MPEG2-TS packets can be unambiguously identified.

TABLE 2 n = 1, x = 16

| $\Delta_{cc}$ | k (# of lost IP packets) | k · n (# of lost MPEG2-TS packets) |
|---|---|---|
| 0 | 0, 16, 32 ...[†] 15, 31, 47 ...[‡] | 0, 16, 32 ...[†] 15, 31, 47 ...[‡] |
| 1 | 0, 16, 32 ... | 0, 16, 32 ... |
| 2 | 1, 17, 33 ... | 1, 17, 33 ... |
| 3 | 2, 18, 34 ... | 2, 18, 34 ... |
| 4 | 3, 19, 35 ... | 3, 19, 35 ... |
| 5 | 4, 20, 36 ... | 4, 20, 36 ... |
| 6 | 5, 21, 37 ... | 5, 21, 37 ... |
| 7 | 6, 22, 38 ... | 6, 22, 38 ... |
| 8 | 7, 23, 39 ... | 7, 23, 39 ... |
| 9 | 8, 24, 40 ... | 8, 24, 40 ... |
| 10 | 9, 25, 41 ... | 9, 25, 41 ... |
| 11 | 10, 26, 42 ... | 10, 26, 42 ... |
| 12 | 11, 27, 43 ... | 11, 27, 43 ... |
| 13 | 12, 28, 44 ... | 12, 28, 44 ... |
| 14 | 13, 29, 45 ... | 13, 29, 45 ... |
| 15 | 14, 30, 46 ... | 14, 30, 46 ... |

[†]If duplicate data packets are used
[‡]If duplicate data packets are not used

TABLE 3 n = 6, x = 16

| $\Delta_{CC}$ | k (# of lost IP packets) | k · n (# of lost MPEG2-TS packets) |
|---|---|---|
| 0 | 0, 8, 16 ...[†] | 0, 48, 96 ...[†] |
| 1 | 0, 8, 16 ... | 0, 48, 96 ... |
| 3 | 3, 11, 19 ... | 18, 66, 114 ... |
| 5 | 6, 14, 22 ... | 36, 84, 132 ... |
| 7 | 1, 9, 17 ... | 6, 54, 102 ... |
| 9 | 4, 12, 20 ... | 24, 72, 120 ... |
| 11 | 7, 15, 23 ... | 42, 90, 138 ... |
| 13 | 2, 10, 18 ... | 12, 60, 108 ... |
| 15 | 5, 13, 21 ... | 30, 78, 126 ... |

[†]If duplicate data packets are used (If duplicate data packets are not used, then $\Delta_{cc}$ can never be 0 for n = 6)

Figure 5:
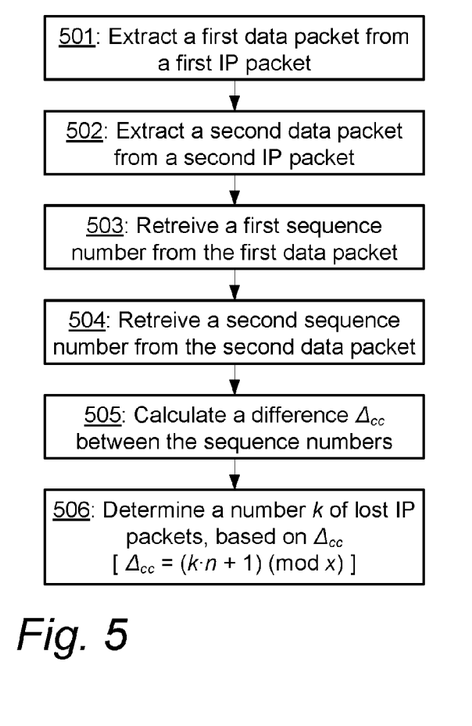
FIG. 5 is a principal flow chart of a method for determining loss of IP packets.

With further reference to FIG. 5, a principal flow chart is illustrated which shows how the number k of lost of IP packets can be determined based on the difference $\Delta_{cc}$ between continuity counters.

In a first step 501 a first data packet is extracted from a first IP packet and in a next step 502 a second data packet is extracted from a second IP packet. The IP and data packets correspond to the respective packets described above, and the extractions are performed according to known techniques and protocols. In this context, it should be noted that the first and sec- and IP packets must not be consecutive IP packets, i.e. there may be a number of IP packets in between the first and second IP packet.

In a next step 503 a first sequence number is retrieved from the first data packet and in a next step 504 a second sequence number is retrieved from the second data packet. Each of the sequence numbers corresponds to the continuity counters described above and their retrieval is per se done according to known techniques. Thus, each of the sequence number has a value belonging to the set of x number of unique values.

In a next step 505 an absolute difference $\Delta_{cc}$ between the sequence numbers is calculated.

In a final step 506 a number k of lost IP packets is determined, based on the difference $\Delta_{cc}$ between the sequence numbers. Typically, expression (8) or a table like one above can be used for this determination.

If each IP packet contains more than one type of data packets, and each data packet type has its own separate sequence number, the procedures described above are applied per data packet type independently, and the possible number of lost IP packets per data packet type may be calculated. The results from each data packet type can then be compared, and the lowest number of lost IP packets which can be found for each data packet type is the final number of lost IP packets.

Figure 6:
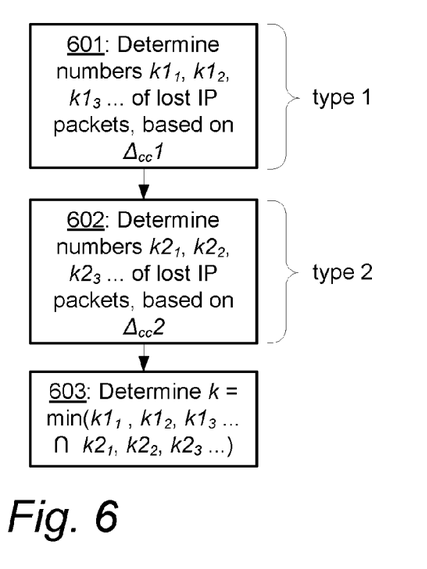
FIG. 6 is a principal flow chart of a method for determining loss of IP packets when different data packets are included in the IP packets.

This situation is illustrated by FIG. 6, where a first step 601 determines numbers $k1_1$, $k1_2$, $k1_3$ ... of possibly lost IP packets based on a $\Delta_{cc}1$-value calculated for data packets of type-1. The numbers $k1_1$, $k1_2$, $k1_3$ ... correspond to the possible values of IP packet loss which produces the same $\Delta_{CC}1$-value, and can be retrieved from a table like tables 1-3.

Step 601 corresponds to performing steps 501-506 of FIG. 5 for all data packets of type-1, while ignoring data packets of another type. However, instead of retrieving only one value that represents the lowest number of lost IP packets, several values ($k1_1$, $k1_2$, $k1_3$ ... ) are retrieved. This means that e.g. $k1_1$ and $\Delta_{cc}1$ corresponds to k and $\Delta_{cc}$ described above, with the difference that they are valid for a certain type of data packets (type-1 packets).

In a next step 602 numbers $k2_1$, $k2_2$, $k2_3$ ... of possibly lost IP packets is determined based on a $\Delta_{cc}2$-value calculated for data packets of type-2. Step 602 corresponds to step 601, with the difference it is performed for type-2 data packets while ignoring data packets of other types.

In a next step 603 the $k1_1$, $k1_2$, $k1_3$ ... values and the $k2_1$, $k2_2$, $k2_3$ ... values are compared and k is set to the lowest, common number of lost data packets for both data types, i.e. k is the smallest value for the intersection of $k1_1$, $k1_2$, $k1_3$ ... and $k2_1$, $k2_2$, $k2_3$ (k=min($k1_1$, $k1_2$, $k1_3$, ... ∩ $k2_1$, $k2_2$, $k2_3$ ... ).

For example, assume there are 6 data packets of type-1 and 1 data packet of type-2 in each IP packet, and that $\Delta_{cc}1$ for type-1 packets is 13, and that $\Delta_{cc}2$ for the type-2 packets is 11. From Table 3 above it can be established that the number of lost IP packet for type-1 must be one of 2, 10, 18 ..., and from Table 2 it can be established that for the type-2 packets the number of lost IP packets must be one of 10, 26, 42 .... Since the actual number of lost IP packets must be the same, it can now be determined that 10 IP packets are lost, i.e. that k=10.

The methods of FIGS. 5 and 6 may be iterative in the sense that they are repeatedly performed for continually providing a value that indicates loss of IP packets.

Packet loss rate may also be determined, in which case both the number of received packets and the number of lost packets must first be determined. Specifically, packet loss rate is calculated as the number of lost packets divided by the sum of the number of lost packets and the number of received packets.

For determining the packet loss rate the payload start flag in the MPEG2-TS header may be investigated. This payload start flag, or PUSI, is set to 1 if the MPEG2-TS packet contains the start of data. After a (detected) packet loss, the customer equipment discards received packets until it receives a packet with the payload start flag set to 1.

Figure 7:
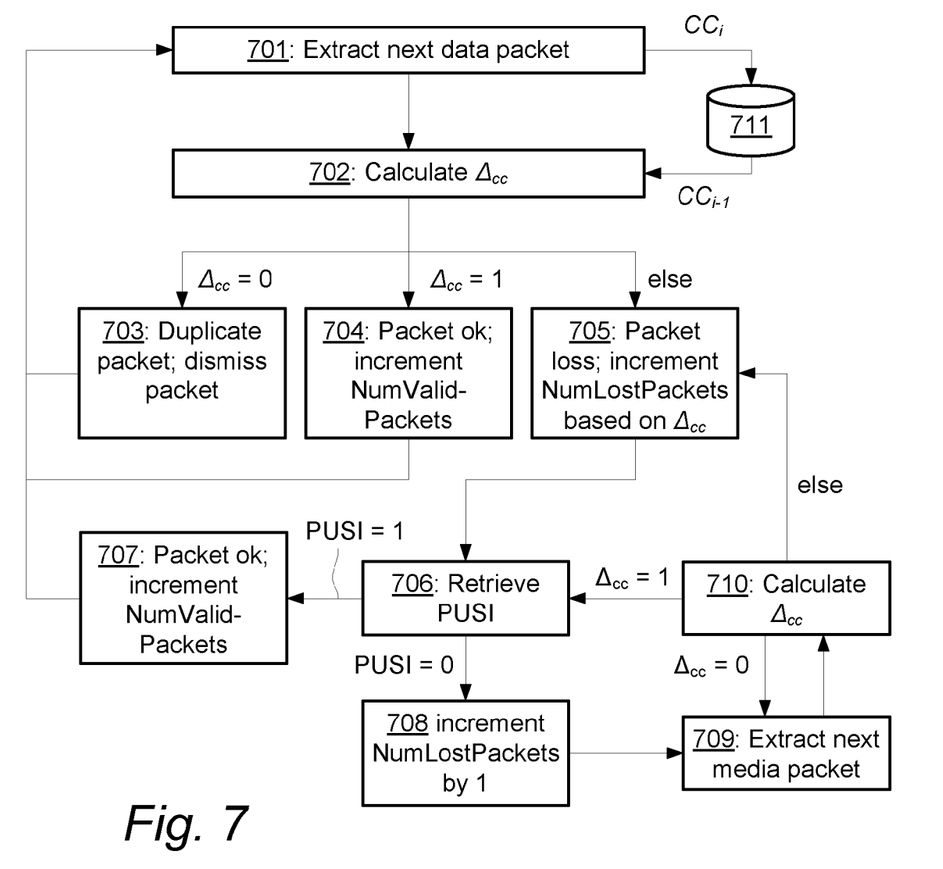
FIG. 7 illustrates an alternative embodiment of the method of FIG. 5.

For illustrating how packet loss rate may be determined reference is made to FIG. 7, which in principle is an enhanced embodiment of the method illustrated by FIG. 5

This enhanced embodiment is iterative and a first step 701 comprises extracting a data packet from an IP packet. The data packet is typically an MPEG2-TS packet that is retrieved from a number of consecutive MPEG2-TS packets that are received via a stream of IP packets. The step 701 includes extraction of a sequence number CC, from the data packet, and storage of the sequence number CC, in a memory unit 611. The extraction of the data packet and the sequence number is performed according to known techniques.

In a next step 702 a difference $\Delta_{CC}$ between the retrieved sequence number $CC_i$ and a most previously retrieved sequence number $CC_{i-1}$ is determined. The most previously retrieved sequence number $CC_{i-1}$ can be obtained from the memory unit 611 where it was stored during a previous iteration of the method. If no most previously retrieved sequence number $CC_{i-1}$ can be obtained the iteration is repeated from step 701.

Next one of three steps 703, 704, 705 is entered depending on which value the difference $\Delta_{CC}$ has.

If $\Delta_{CC}=0$ then the data packet is redundant, the data packet is dismissed in step 703, and the first step 701 is re-entered. Step 703 is typically performed if duplicate data packets are used.

If $\Delta_{CC}=1$ then the data packet is valid, step 704 is entered and the number of received MPEG2-TS packets that are valid is incremented by one. After step 704 the first step 701 is re-entered.

If $\Delta_{CC}$ is neither 1 nor 0, then the data packet is lost, a number of lost MPEG2-TS packets is incremented in step 705, and a next step 706 is entered. The incrementation in step 705 corresponds to a value of lost data packets that is determined on basis of k·n that can be derived from a table like the tables above.

This next step 706 comprises retrieving and checking the PUSI of the data packet, and, if PUSI=1, then the data packet is valid and a next step 707 is entered which increments the number of valid packets that are received. After step 707 the first step 701 is re-entered. If PUSI=0 in step 706, then a next step 708 is entered which increments the number of lost data packets by one.

Thereafter, in a next step 709 a next data packet is extracted and its sequence number is retrieved, in a manner similar with step 701. In a step 710 after the extraction a difference $\Delta_{CC}$ between a retrieved sequence number of the data packet extracted in step 709 and a most previously retrieved sequence number is determined. The steps 709, 710 cooperate with the database 611 or a similar database, such that previous sequence numbers may be obtained as required for calculating the difference $\Delta_{CC}$, just like in step 702.

After step 710, if $\Delta_{CC}=0$ then step 709 is re-entered, if $\Delta_{CC}=1$ then step 706 is entered, and if $\Delta_{CC}$ is neither 0 nor 1 then step 705 is entered.

The packet loss rate can be continuously calculated by employing the incremented number of valid packets and the incremented number of lost packets.

In principle, step 701 and/or step 709 correspond to steps 501-504 of FIG. 5, while step 702 and/or step 710 correspond to step 505.

As mentioned, the described customer equipment typically includes one or more processing units that may execute software instructions, i.e. computer program code that carry out the above described steps. For this purpose the customer equipment may use its computer-readable memory that stores such software instructions. These may for development convenience be written in a high-level programming language such as Java, C, and/or C++ but also in other programming languages, such as, but not limited to, interpreted languages. Also, one or more processing units may be used for implementing the described steps.

Thus, although various embodiments of the invention have been described and shown, the invention is not restricted thereto, but may also be embodied in other ways within the scope of the subject-matter defined in the following claims.

The invention claimed is:

1. A method of determining loss of IP packets for assessing service performance that are transported over a network, where each IP packet comprises a number (n) of data packets, the method comprising:
   extracting a first data packet from a first IP packet,
   extracting a second data packet from a second IP packet,
   retrieving a first sequence number from the first data packet and a second sequence number from the second data packet, where each of the sequence numbers is indicative of a sequence of data packets and has a value belonging to a set of a number (x) of unique values,
   calculating a difference ($\Delta_{cc}$) between the sequence numbers,
   determining a number (k) of lost IP packets, as a function of the difference ($\Delta_{cc}$) between the sequence numbers, the number of data packets (n) in an IP packet, and the number of unique (x) values in the set to which the sequence numbers belong, wherein each IP packet comprises an UDP packet with an UDP header and the number (n) of data packets is calculated from a length (L-udp) of the IP packet, a length (L-udh) of an UDP header and a length (L-data) of a data packet transported in the IP packet, and
   reporting the number of lost IP packets by a customer equipment.

2. A method according to claim 1, wherein the data packets are MPEG2-packets.

3. A method according to claim 1, wherein n=(L-udp −L-udh)/L-data, where n is the number of data packets, L-udp is the length of the UDP packet, L-udh is a length of a UDP header, and L-data is a length of a data packet transported in the IP packet.

4. A method according to claim 1, wherein the number (n) of data packets is 7.

5. A method according to claim 1, wherein the number k of lost IP packets is determined from the expression $\Delta_{cc}=(k \cdot n+1)(\mod x)$, where $\Delta_{cc}$ is the difference between the sequence numbers, n is number of data packets comprised in an IP packet, and x is the number of unique values in the set to which the sequence numbers belong.

6. A method according to claim 1, wherein the number (x) of unique values in the set to which the sequence numbers belong is equal to or less than 256.

7. A method according to claim 1, wherein the number (x) of unique values in the set to which the sequence numbers belong is 16.

8. A method according to claim 1, wherein the first data packet is the first packet in the first IP packet.

9. A method according to claim 1, wherein the second data packet is the last packet in the second IP packet.

10. A method according to claim 1, further comprising determining a number (k·n) of lost data packets, by multiplying the number (k) of lost IP packets with the number (n) of data packets comprised in an IP packet.

11. A method according to claim 1, further comprising, if an IP packet is lost, retrieving from the second data packet a payload start flag, and, if the flag is not indicative of start of data, iteratively:
   incrementing the number (k) of lost IP packets until
      a next calculated difference ($\Delta_{cc}$) between the first sequence number and -a sequence number of a next data packet indicates that no further data packet is lost, and
      a payload start flag of the next data packet is indicative of start of user data.

12. A method according to claim 1, wherein the IP packets transported over the network comprise a first and a second type of data packets, and the difference ($\Delta_{cc}$) between the sequence numbers is calculated for the first type of IP packets, the method further comprising:
   calculating a corresponding difference ($\Delta_{cc}2$) between sequence numbers of the second type of data packets, and
   determining a number (k) of lost IP packets, as a function of a loss value indicated by both calculated differences ($\Delta_{cc}, \Delta_{cc}2$).

13. A non-transitory computer readable medium for determining loss of IP packets for assessing service performance that are transported over a network, where each IP packet comprises n number of data packets, the computer readable medium having stored thereon processing instructions which when run on a customer equipment causes the customer equipment to perform the steps of:
   extracting a first data packet from a first IP packet,
   extracting a second data packet from a second IP packet,
   retrieving a first sequence number from the first data packet and a second sequence number from the second data packet, where each of the sequence numbers is indicative of a sequence of data packets and has a value belonging to a set of a number (x) of unique values,
   calculating a difference ($\Delta_{cc}$) between the sequence numbers,
   determining a number (k) of lost IP packets, as a function of the difference ($\Delta_{cc}$) between the sequence numbers, the number of data packets (n) in an IP packet, and the number of unique (x) values in the set to which the sequence numbers belong, wherein each IP packet comprises an UDP packet with an UDP header and the number (n) of data packets is calculated from a length (L-udp) of the IP packet, a length (L-udh) of an UDP header and a length (L-data) of a data packet transported in the IP packet, and
   reporting the number of lost IP packets by the customer equipment.

14. A customer equipment configured to determine loss of IP packets that are transported over a network for assessing service performance, where each IP packet comprises a number (n) of data packets, the customer equipment comprising a processing unit configured to:
   extract a first data packet from a first IP packet,
   extract a second data packet from a second IP packet,
   retrieve a first sequence number from the first data packet and a second sequence number from the second data packet, where each of the sequence numbers is indicative of a sequence of data packets and has a value belonging to a set of a number (x) of unique values,
   calculate a difference ($\Delta_{cc}$) between the sequence numbers,
   determine a number (k) of lost IP packets, as a function of the difference ($\Delta_{cc}$) between the sequence numbers, the number of data packets (n) in an IP packet, and the number of unique (x) values in the set to which the sequence numbers belong, wherein each IP packet comprises an UDP packet with an UDP header and the number (n) of data packets is calculated from a length (L-udp) of the IP packet, a length (L-udh) of an UDP header and the length (L-data) of a data packet transported in the IP packet, and
   report the number of lost IP packets by the customer equipment.

* * * * *